May 23, 1939. C. C. MONTGOMERY ET AL 2,159,906
AUTOMATIC AIR COUPLING
Filed April 12, 1938   2 Sheets-Sheet 1
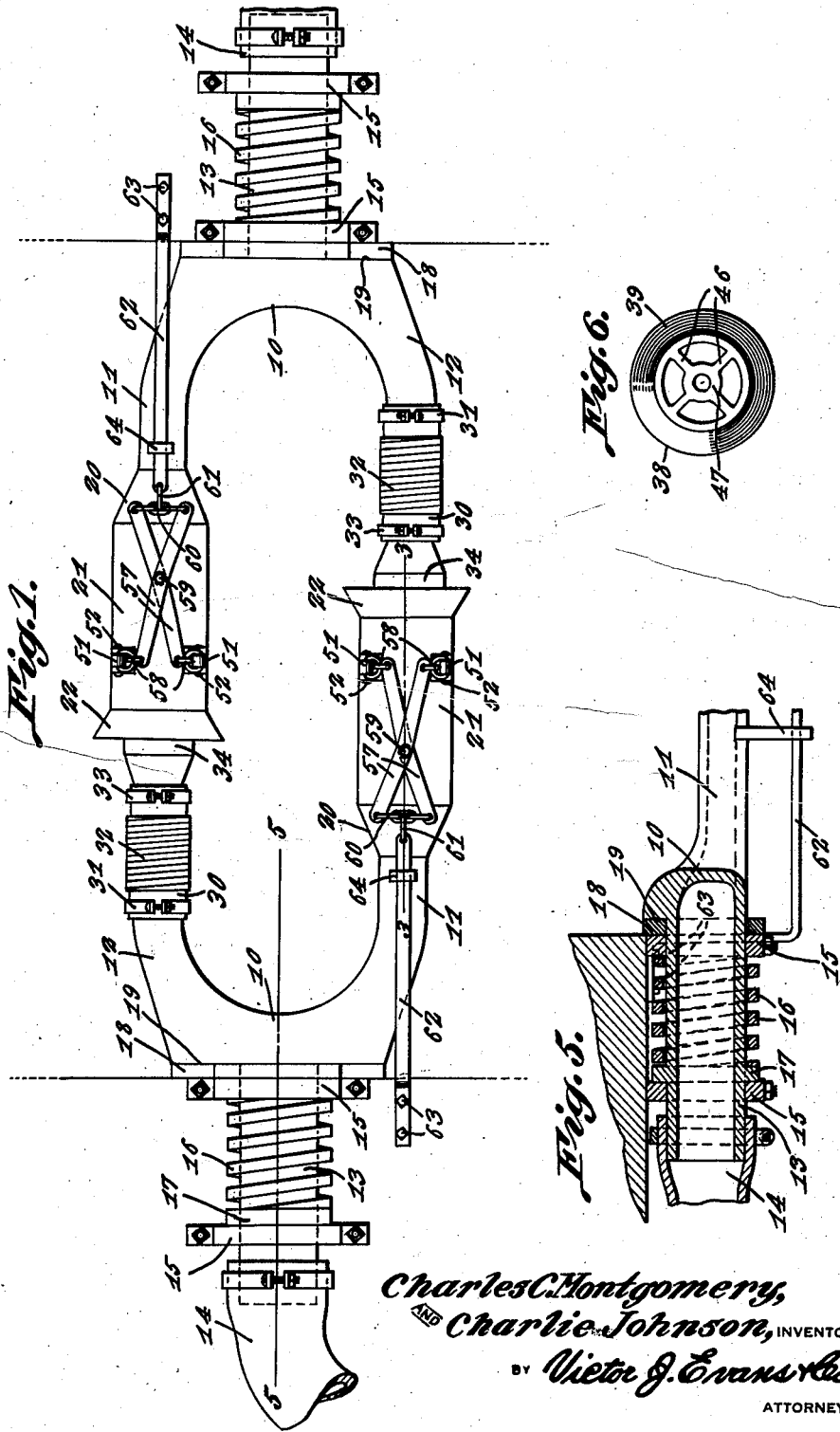

May 23, 1939. C. C. MONTGOMERY ET AL 2,159,906
AUTOMATIC AIR COUPLING
Filed April 12, 1938 2 Sheets-Sheet 2
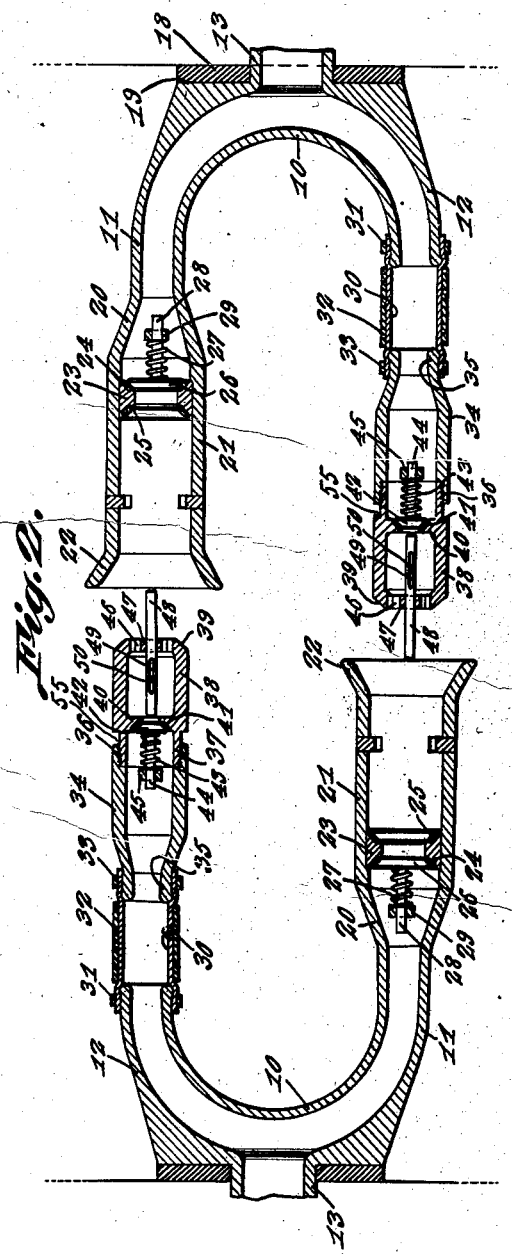
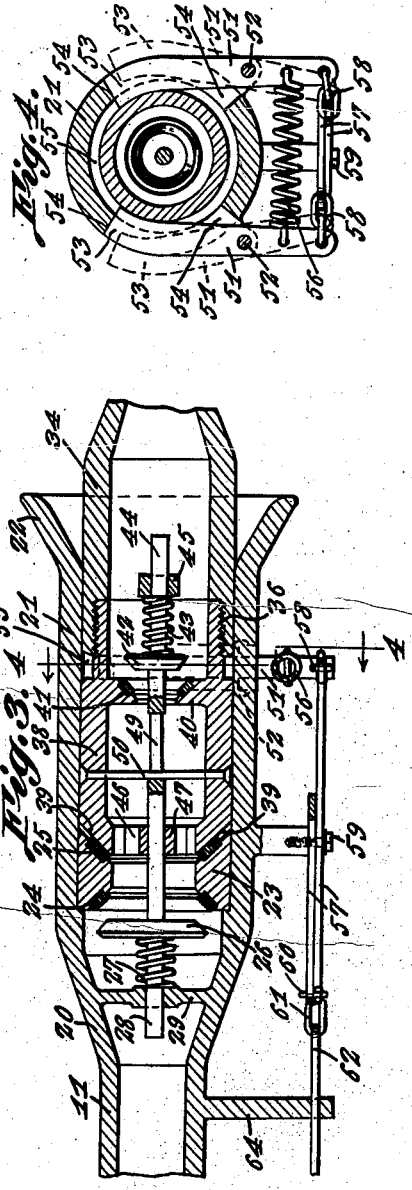
Charles C. Montgomery,
AND Charlie Johnson, INVENTORS
BY Victor J. Evans & Co.
ATTORNEYS Patented May 23, 1939

2,159,906

UNITED STATES PATENT OFFICE 2,159,906

AUTOMATIC AIR COUPLING

Charles Conway Montgomery and Charlie Johnson, Hardburly, Ky.

Application April 12, 1938, Serial No. 201,616

4 Claims. (Cl. 284—5)

This invention relates to automatic air couplings, and more particularly to such couplings that are applied to the ends of railway cars for effecting a connection between the pipe line terminals of the air supply system for operating the brakes and other air-operated utilities of the respective cars in a train.

The invention has for its primary object to produce a simple yet practical and effective coupling unit which may be attached to either end of the car so as to automatically engage a like unit at the opposite end of the adjoining car as it is coupled with the usual draft coupling elements.

A further object is to provide an improved means of locking the engaged air coupling units automatically as the units are brought together and to provide for the automatic unlocking and release of the coupled air units when the draft coupling between the cars is disconnected and the cars are pulled apart.

A still further object is to provide a structure which is readily applied to the car in close proximity to the draft coupling elements and rigging without interference with the operation of either.

With these and other objects and advantages to be attained, as will hereinafter more fully appear, the invention consists in the novel general construction and in the particular parts and combinations and arrangements of parts thereof, as hereinafter described and claimed, reference being had to the accompanying drawings illustrating a practical adaptation of the invention, and in which Figure 1 is an inverted plan view of two coupled units;

Figure 2 is a horizontal section through the two units in uncoupled relation to each other;

Figure 3 is a longitudinal section, on an enlarged scale, taken on or about the line 3—3 of Figure 1;

Figure 4 is a cross-section on the line 4—4 of Figure 3;

Figure 5 is a longitudinal section on the line 5—5 of Figure 1; and

Figure 6 is an end view of the male end member of the unit.

Referring now to the drawings the numeral 10 designates generally the coupling unit which comprises a substantially U-shaped head having branches 11 and 12 with passageways therein which connect with a longitudinal passageway in a tubular stem or shank portion 13 which is connected at its end to a flexible air pipe coupling 14 and is slidably mounted in bracket members 15 located under the end sill or other convenient portion at the under side of the car end, said stem or shank portion 14 being longitudinally slidable in said supporting brackets and yieldably held in a retracted position by a spring 16 coiled thereabout and interposed between the front supporting bracket and a collar 17 provided on said stem or shank portion and normally abutting the inner supporting bracket. Preferably, an elastic bumper element 18, rubber or other suitable material, is located between a shoulder 19 provided on the unit 10 at the base of its branched extensions 11 and 12 and the outer side of the forward supporting bracket 15, said shoulder portion 19 of the unit being normally held against the cushion element 18 by said spring 16, and said collar portion 17 being engageable with the inner supporting bracket 15 as a positive stop for the unit after the inward movement of the unit is initially cushioned by said element 18. In this connection, it is noted that the spring element 16 yields to considerable outward movement of the unit when the pull is exerted on the U-shaped extension tending to move it in that direction when the draft coupling is disconnected and the cars are moved apart as will later more fully appear.

The branch extension 11 of the unit is flared, as at 20, and merges into a cylindrical enlargement 21 constituting the female member of the unit, said cylindrical portion 21 having a flared mouth 22 at its outer end. Within the cylindrical enlargement 21 is a valve seat ring 23 having opposed beveled annular seat portions provided with sealing rings 24, 25, the inner sealing ring 24 having a valve head 26 normally seated therein under the pressure of a spring element 27 surrounding the stem portion 28 of the valve and interposed between the head 26 and a cross member 29 in the flared portion 20 of the branch 11 of the unit, said cross bar 29 having a guide opening therein through which said stem portion 28 is slidably supported.

The opposite branch 12 of the unit has a section of flexible and preferably resilient tubing or hose pipe 30 attached thereto, as at 31, said pipe section 30 being encased by a reinforcing spring 32 which normally holds said pipe section 30 extended, in other words, said spring element 32 constantly reacts to extend itself lengthwise of the pipe section and incidentally tending to tauten said pipe section 30 and at the same time sustain it in a horizontal position, yet permitting lateral flexion and limited endwise contraction under a definite external force applied thereto. Attached to the outer end of the flexible pipe section 30, as at 33, is the male element of the unit comprising a coupling tube 34, the inner end of which is contracted, as at 35, where the pipe section 30 is attached, and the outer end portion being counterbored and internally screw threaded, as at 36, to receive a complemental shank portion 37 of an outer nozzle extension 38. As shown, the nozzle extension 38 comprises a hollow cylindrical body tapered at its outer end, as at 39, to provide an annular seating portion to engage the sealing ring 25 of the outer valve seat of the ring 23 within the cylindrical enlargement 21 of the female extension of the unit when two of the units are brought into coupling relation as shown in Figure 1. The nozzle member 38 is provided near its inner end with an internal annular shoulder 40 formed with a beveled valve seat portion which is provided with a resilient sealing ring 41, said sealing ring 41 being normally engaged by a valve head 42 under the pressure of a spring element 43 which is sleeved about its stemmed portion 44 and interposed between said valve head 42 and a cross bar 45 provided with an opening in which the stem 44 is slidably supported, said cross bar 45, as shown, being a part of the tubular extension 34, although it may be obviously provided on the shank portion 37 of the member 38 instead of the member 34. In the outer end portion of the nozzle member 38 is a spider 46 within the central hub portion 47 of which a valve tripping plunger bar 48 is slidably mounted, said bar 48 being provided with a longitudinal slot 49 through which a cross pin 50 is extended diametrically from side to side of the member 38, said slot being of sufficient length to permit relative endwise movement of said plunger bar 48 to effect the opening of both the valve 26 and the valve 42 of both branches of the respective units when they are brought into coupled relation, and at the same time preventing the complete withdrawal of the plunger bar from the member 38 when the unit is uncoupled.

By the foregoing described construction and arrangement of the parts, it is apparent that the units can be conveniently mounted at the opposite ends of the cars so as to be within coupling range of each other when two cars are brought together for automatic engagement simultaneously with the draft coupling of the cars, the nozzle members 38 of the male extensions being guided by the flared mouth portions 22 of the cylindrical extensions 21 of the female branches of the units, it being understood that the structure is proportioned so that the beveled end seat 39 of the member 38 engages the sealing ring 25 of the opposed seat ring 23 and there being ample resiliency in the spring encased flexible pipe section 30 to maintain the air-tight sealing effect of the seat portion 39 upon the ring 25, and at which time the plunger bar 48 has effected the opening of the valves 26 and 42 so that communication is established between the respective tubular shank portions 13 and the branches 11 and 12 of the units.

In order to hold the units in their coupled relation an automatically engageable and releasable latching means is provided. Preferably, as shown, this latching means includes a pair of oppositely disposed dogs 51 which are hingedly mounted, as at 52, at opposite lower sides of the cylindrical extension 21 of the branch 11 of the unit, the upper end portions of said dogs 51 being curved, as at 53, and working in slots 54 in said cylindrical member 21 and being normally held inward in position to engage in an annular external groove 55 provided therefor in the male coupling extension or nozzle member 38 of the branch 12 of the unit when a coupling of the two units is effected (see Figures 3 and 4). The dogs 51 are held in the said normal engaging position by a spring 56 which is located between the lower end portions of said dogs and normally under compression so as to constantly react to move said lower portions of the dogs apart, and by which provision the engagement of the upper end portions of said dogs 51 in the annular groove 55 of the member 38 is automatically effected by a snap action when the two units are brought together in coupled relation, that is to say, the beveled seat portion 39, of the nozzle member 38 first engages said dogs 51 to spread their upper end portions outwardly, after which the dogs ride on the circumference of the member 38 until the annular groove 55 is in position to receive the dogs 51, whereupon said spring element 56 reacts to effect the engagement as just above described.

To effect an automatic release of the locking dogs 51, the lower ends of said dogs are connected to a pair of toggle levers 57 by links 58, said toggles being hingedly mounted in cross relation to each other on the under side of the cylindrical enlargements 21, as at 59, and the opposite end portions of said levers 57 being cross-connected by links 60, and said links 60 being connected centrally thereof, as at 61, to a longitudinal bar 62 which is fastened, as at 63, to an adjacent portion of the end sill or other convenient portion of the car and said bar 62 being slidably supported in an eye or guide lug 64 located on the under side of the branch 11 of the coupling unit near the flared portion 20 thereof. By this provision, if the draft coupling between the cars is disconnected, either intentionally or accidentally, and the two cars are moved apart, the spring elements 16 which are coiled about the shank portions 13 of the units between the collars 17 and the outer supporting brackets 15 yield to the opposite pulls of cars in moving apart, the bars 62 being connected to the cars, as just above described, and thereby being pulled with the cars, a pull is exerted on the links 60 whereby to effect a closing movement of the toggle levers 57 to thereby draw the lower end portions of each pair of dogs 51 toward each other, whereupon the upper end portions of said dogs are swung outwardly and clear of the annular grooves 55 in said nozzle members 38 and the units are then free to separate. As soon as the two units have moved a sufficient distance apart the valves 26 and 42 automatically close under the pressure of their respective spring elements 27 and 43, thereby closing the pipe terminals of the air system of the respective cars, and the springs 16 react to restore the units to their normal positions, the inward movement of the units being cushioned by the elements 18 which prevent the forcible impact of the collar 17 against the inner brackets 15.

Obviously, the structure admits of considerable modification and alteration within the spirit of the invention as defined by the appended claims, the invention, therefore, is not limited to the specific construction and arrangements shown in the accompanying drawings.

What is claimed is:

1. In an automatic air coupling for cars and the like, a unit attachable to the end of a car and engageable with a like unit on a draft-coupled car, each unit comprising a central stem portion having a longitudinal passageway and attached communicably to the air supply of the car, a substantially U-shaped branched extension from said stem portion having passageways communicating with the passageway of said stem portion, spring means for normally holding said unit in retracted relation to the car end, one of said branches comprising the female member of the coupling and having an inwardly opening check valve therein, the other branch comprising the male member of the coupling and having an inwardly opening check valve therein, a plunger element mounted axially in said male coupling element with its inner end in cooperative relation to the check valve of said male element and its outer end projected to engage the check valve of the female element when two of said units are coupled, means for automatically locking said units in coupled position including pairs of opposed spring-pressed dogs respectively located on opposite sides of the female elements of the units and engageable in peripheral recessed portions of the coupled male elements, and means for automatically releasing said locking means when the draft coupling of the two cars on which the two units are mounted is disconnected and the cars are moved apart from each other, said releasing means including toggle levers connected to the respective pairs of dogs and having link connections with the respective car ends.

2. Means for effecting an automatic air pipe coupling between two draft-coupled cars, comprising a pair of like coupling units respectively mounted in reverse engaging relation on the meeting ends of the two coupled cars, each unit comprising a central stem portion provided with a passageway for communicable attachment to the air supply pipe of the car, a pair of branched extensions having passageways communicating with the passageway of the stem portion, one of said branches constituting the female coupling member of the unit and being provided with a flared outer end portion and an inwardly opening internal check valve, the opposite branch constituting the male member of the unit and having a nozzle extension, an interposed flexible pipe with an encasing spring element yieldably holding said nozzle member extended, said nozzle member having an inwardly opening check valve and an annular seat portion at its outer end, said annular end seat portion being engageable with an internal seat within the female member of the unit adjacent the check valve of the latter when the units are coupled, and valve tripping means on one of said members for effecting an automatic opening of the respective check valves when the units are coupled.

3. Means for effecting an automatic air pipe coupling between two draft-coupled cars, comprising a pair of like coupling units respectively mounted in reverse engaging relation on the meeting ends of the two coupled cars, each unit comprising a central stem portion provided with a passageway for communicable attachment to the air supply pipe of the car, a pair of branched extensions having passageways communicating with the passageway of the stem portion, one of said branches constituting the female coupling member of the unit and being provided with a flared outer end portion and an inwardly opening internal check valve, the opposite branch constituting the male member of the unit and having a nozzle extension, an interposed flexible pipe with an encasing spring element yieldably holding said nozzle member extended, said nozzle member having an inwardly opening check valve and an annular seat portion at its outer end, said annular end seat portion being engageable with an internal seat within the female member of the unit adjacent the check valve of the latter when the units are coupled, valve tripping means on one of said members for effecting an automatic opening of the respective check valves when the units are coupled, latch means for automatically locking said units in coupled position, and means for automatically releasing said latching means when the draft coupling between the cars is disconnected and the cars are pulled apart from each other.

4. In an automatic air coupling for cars and the like, a pair of opposed coupling elements engageable one within the other, means for releasably latching said elements in coupled relation, said means including an opposed pair of pivotal dogs on the outer member and an external recessed portion on the inner member to receive said dogs, resilient means normally urging said dogs in locking relation, and means for moving said dogs out of locking relation when the draft coupling between the cars is disconnected and the cars are moved apart from each other.

CHARLES CONWAY MONTGOMERY.
CHARLIE JOHNSON.